US008127446B2

(12) United States Patent
LaBoskey et al.

(10) Patent No.: US 8,127,446 B2
(45) Date of Patent: Mar. 6, 2012

(54) METHOD OF MANUFACTURING A STEERING WHEEL

(75) Inventors: Christopher P. LaBoskey, Bradenton, FL (US); Barry C. Worrell, Dayton, OH (US); Kurt F. O'Connor, Carmel, IN (US)

(73) Assignee: Autoliv Development AB, Vargarda (SE)

( * ) Notice: Subject to any disclaimer, the term of this patent is extended or adjusted under 35 U.S.C. 154(b) by 1063 days.

(21) Appl. No.: 11/935,359

(22) Filed: Nov. 5, 2007

(65) Prior Publication Data

US 2008/0105077 A1  May 8, 2008

Related U.S. Application Data

(60) Provisional application No. 60/864,341, filed on Nov. 3, 2006, provisional application No. 60/864,311, filed on Nov. 3, 2006.

(51) Int. Cl.
*B21D 53/26* (2006.01)
*B62D 1/06* (2006.01)
(52) U.S. Cl. .............................. 29/894.1; 29/428; 74/558
(58) Field of Classification Search ............... 29/894.1, 29/428; 74/552, 558
See application file for complete search history.

(56) References Cited

U.S. PATENT DOCUMENTS

| 4,547,655 | A | * | 10/1985 | Kurata et al. ............... 219/204 |
| 4,662,238 | A | * | 5/1987 | Zeller ............................. 74/552 |
| 5,544,545 | A | * | 8/1996 | Sanders et al. ................. 74/552 |
| 6,360,632 | B1 | * | 3/2002 | Papandreou ..................... 74/558 |
| 6,371,507 | B1 | * | 4/2002 | Durrani et al. ............. 280/728.2 |
| 6,761,086 | B2 | | 7/2004 | Kreuzer et al. |
| 6,889,576 | B2 | | 5/2005 | Miltenberger |
| 6,928,898 | B2 | | 8/2005 | Albayrak et al. |
| 6,988,878 | B2 | | 1/2006 | Ito et al. |
| 7,001,549 | B1 | | 2/2006 | Stieler |
| 2007/0017317 | A1 | * | 1/2007 | Cortina et al. ................. 74/552 |

FOREIGN PATENT DOCUMENTS

GB   2028181  A  * 3/1980

* cited by examiner

*Primary Examiner* — Sarang Afzali
(74) *Attorney, Agent, or Firm* — Harness, Dickey & Pierce, P.L.C.

(57) ABSTRACT

A method of manufacturing a steering wheel, comprising: forming a rim portion separately with a decorative outer coating via a first forming process; forming a hub separately from the rim portion via a second forming process, the hub having at least a pair of spoke portions; and securing the rim portion to the pair of spoke portions, wherein the decorative outer coating is applied to the rim portion prior to the rim portion being secured to the pair of spoke portions.

15 Claims, 10 Drawing Sheets

METHOD OF MANUFACTURING A STEERING WHEEL

CROSS REFERENCE TO RELATED APPLICATIONS

This application claims the benefit of U.S. Provisional Patent Application Ser. Nos. 60/864,311 and 60/864,341 each filed on Nov. 3, 2006, the contents each of which are incorporated herein by reference thereto.

BACKGROUND

Exemplary embodiments of the present invention are related to the design and manufacture of a steering wheel.

Steering wheels come in various trim levels and colors. Some wheels are wrapped in leather, which is a very labor intensive process requiring up to ½ hour per wheel to wrap the steering wheel. Steering wheel suppliers are also constantly being requested to provide steering wheels having varying designs and trims. In addition, the steering wheel suppliers are also constantly being faced with cost pressures as well as production flexibility.

Today, a steering wheel is typically produced by first manufacturing a die cast structure comprising both a steering wheel hub and integral rim portion, then the die cast structure is placed in a mold and a covering material is molded around it. Thereafter an outer covering layer may be placed on the steering wheel. In one application the molded material comprises the outer covering layer while in other applications wood or layer is applied to the molded material. If the outer covering layer is leather, a leather pattern is hand sewn onto the rim and spokes of the steering wheel. This is achieved by placing a precut pattern onto the rim and hand sewing it onto the rim of the steering wheel, which as discussed above takes approximately ½ hour to perform.

Accordingly, it is desirable to provide a steering wheel and method of manufacture wherein various designs and trims are available and the same is manufactured in a cost efficient manner.

SUMMARY

In one exemplary embodiment of the present invention, a method of manufacturing a steering wheel is provided, the method comprising: forming a rim portion separately with a decorative outer coating via a first forming process; forming a hub separately from the rim portion via a second forming process, the hub having at least a pair of spoke portions; and securing the rim portion to the pair of spoke portions, wherein the decorative outer coating is applied to the rim portion prior to the rim portion being secured to the pair of spoke portions.

In another exemplary embodiment of the present invention, a method of manufacturing a steering wheel is provided, the method comprising: separately forming a rim insert portion; covering the rim insert portion by a foaming process; applying a decorative outer coating to the rim insert portion after the foaming process; forming a hub separately from the rim portion, the hub having at least a pair of spoke portions; and securing the rim portion to the pair of spoke portions, wherein the decorative outer coating is applied to the rim portion prior to the rim portion being secured to the pair of spoke portions.

In still another exemplary embodiment, a steering wheel is provided. The steering wheel, comprising: a separately formed rim portion having a metal insert, a foam layer applied to the metal insert and a decorative outer layer applied to the foam layer; and a separately formed hub portion having a pair of integral spoke portions the integral spoke portions being secured to the rim portion after the application of the foam layer and the decorative outer layer to the rim portion.

The above-described and other features and advantages of the present invention will be appreciated and understood by those skilled in the art from the following detailed description, drawings, and appended claims.

DETAILED DESCRIPTION

Figure 1:
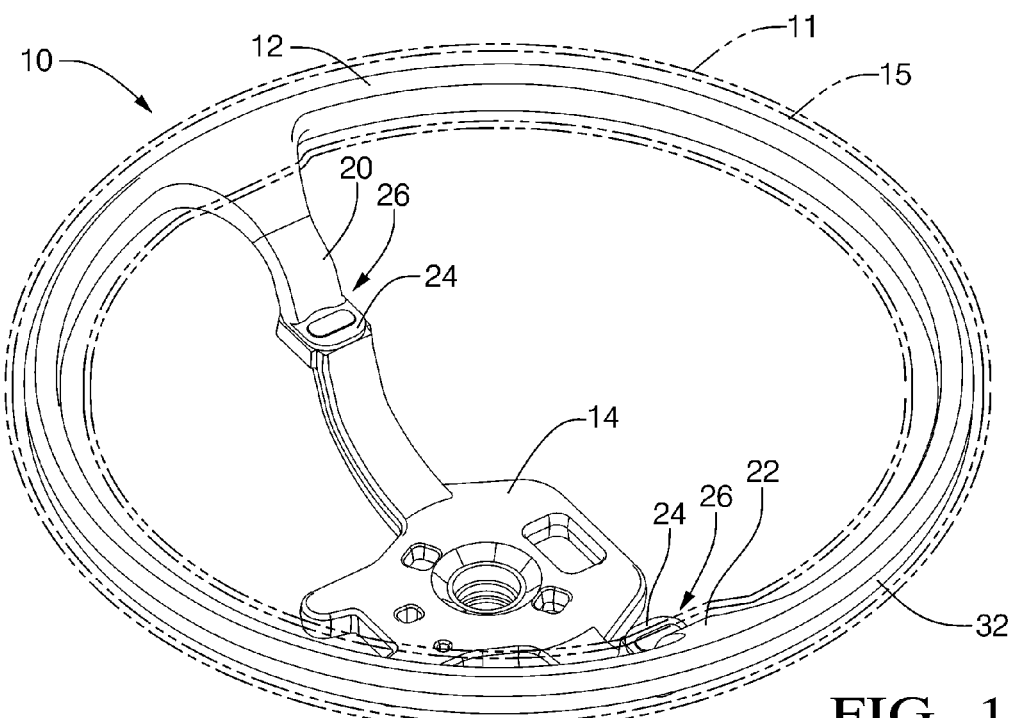
FIG. 1 is a perspective view of a steering wheel manufactured in accordance with an exemplary embodiment of the present invention.
Figure 2:
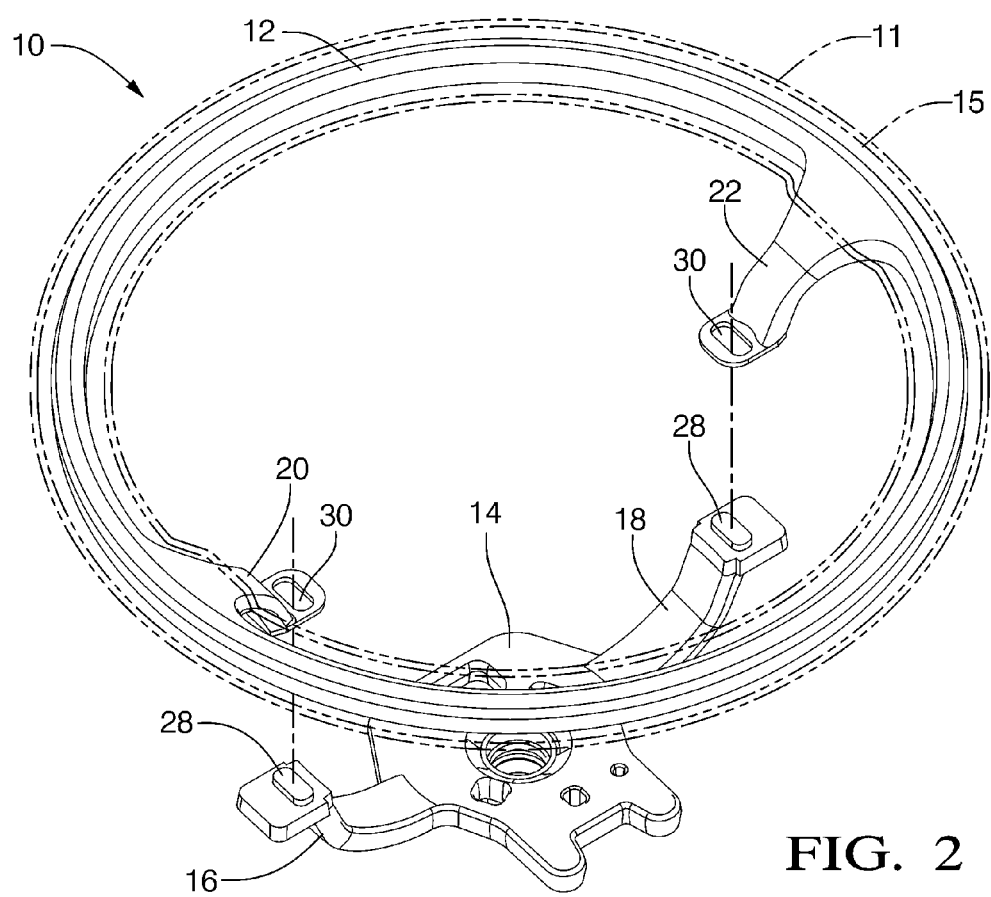
FIG. 2 is an exploded perspective view of a steering wheel manufactured in accordance with an exemplary embodiment of the present invention.
Figure 3:
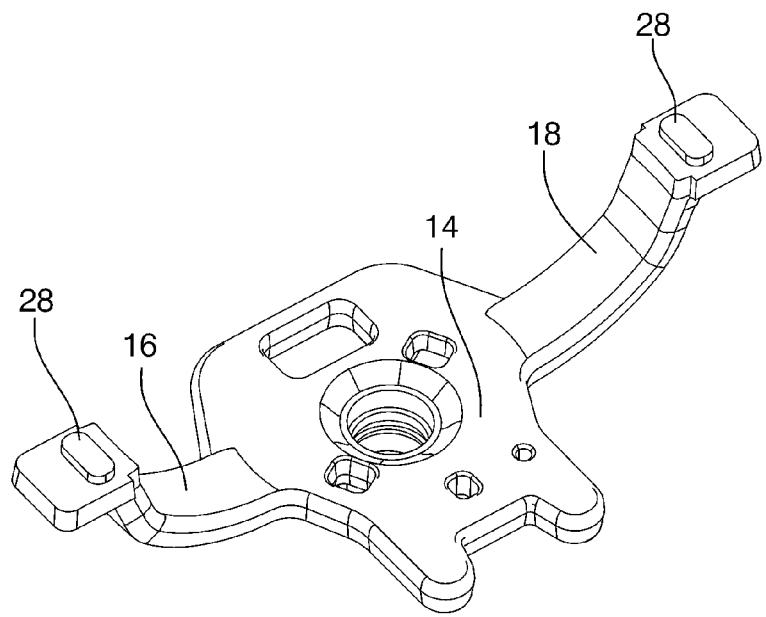
FIG. 3 is a perspective view of a hub of a steering wheel manufactured in accordance with an exemplary embodiment of the present invention.
Figure 4:
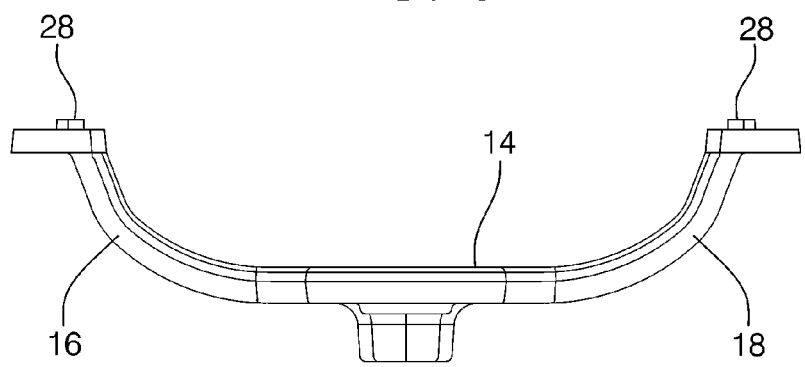
FIG. 4 is a view along lines 4-4 of FIG. 3.
Figure 5:
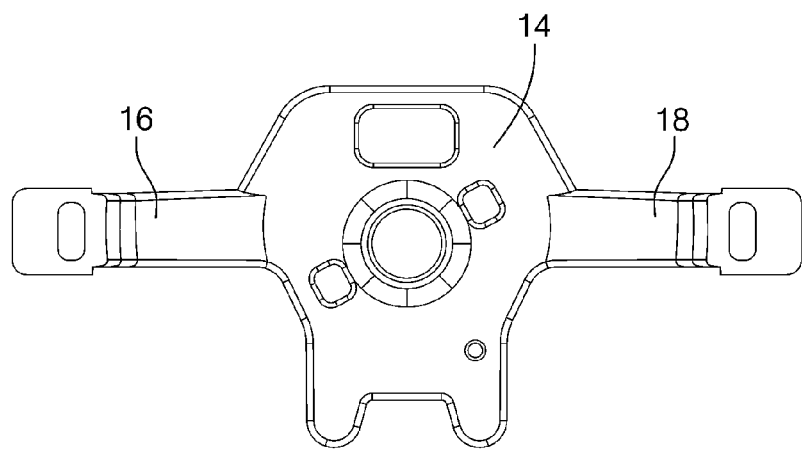
FIG. 5 is a top plan view of a hub of a steering wheel manufactured in accordance with an exemplary embodiment of the present invention.
Figure 6:
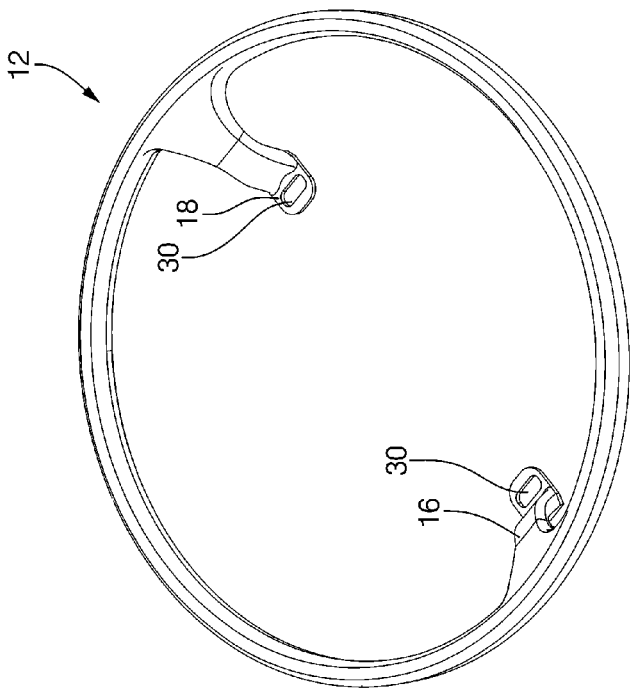
FIG. 6 is a top plan view of a rim manufactured in accordance with an exemplary embodiment of the present invention.
Figure 8:
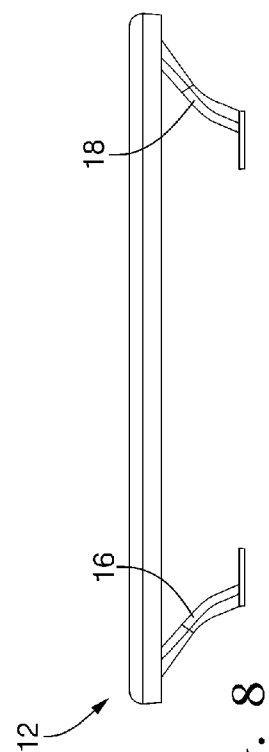
FIG. 8 is a view along lines 8-8 of FIG. 6.
Figure 7:
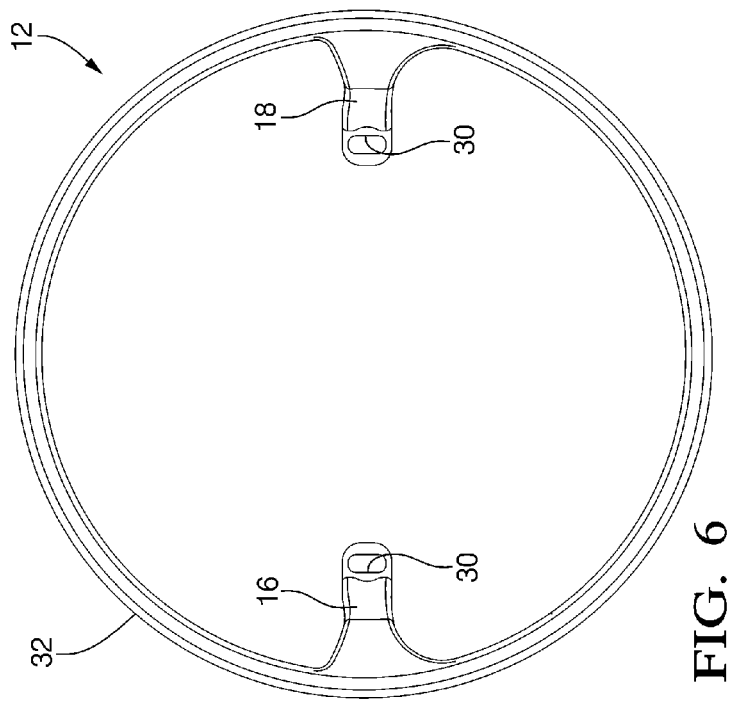
FIG. 7 is a perspective view of a rim manufactured in accordance with an exemplary embodiment of the present invention.
Figures 9, 10:
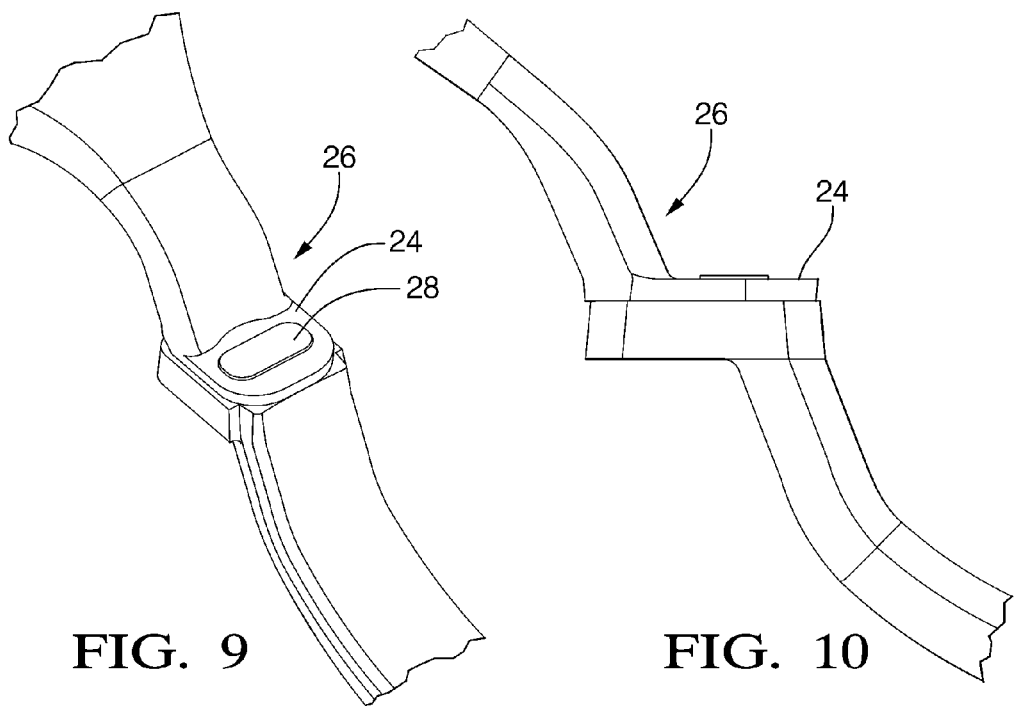
FIGS. 9 and 10 are views illustrating the securement of the rim portion and the hub portion in accordance with an exemplary embodiment of the present invention.

In accordance with exemplary embodiments of the present invention a segmented steering wheel and method of manufacture is disclosed herein. In accordance with an exemplary embodiment, the rim is segmented from the spokes and hub of the steering wheel. This will allow the steering wheel rim with leather and/or wood trim to be manufactured as a separate component. One advantage of this is that the steering wheel rim and hub may be manufactured at separate locations as well as being shipped separately. Moreover, the separated steering wheel rim and hub allow for improved packaging efficiencies thus making the associated shipping costs lower. In other words a plurality of steering wheel rims and a plurality of steering wheel hubs will require less packaging than a corresponding number of steering wheels having the rims and hubs secured together.

Moreover and by separately manufacturing the steering wheel rim, the associated costs for manufacturing the same, with a decorative outer layer such as leather, will be reduced as this results in significant improvements in the leather wrapping since the pattern can be sewn with automated machinery.

In addition, this also allows the center hub and spoke section of the steering wheel to be made in a multi-cavity die cast machine wherein the productivity of this very expensive machine is increased since it is only being used to form the hub and spoke section of the steering wheel.

Another advantage is that a common center hub with spoke sections can be joined to a multitude of rim diameters. For example, a larger rim diameter may have integral spoke sections extending inwardly to be secured to the spoke sections of the hub. Alternatively, a smaller diameter rim portion will have the spoke sections of the hub directly secured to the rim portion thus, a single hub portion may be employed or used for rims having varying diameters.

In addition, exemplary embodiments of the present invention allows for a common hub with spoke section to be joined to various trim levels in the rim, for example one rim would have a decorative outer layer of wood and/or leather separately installed or another would comprise leather or wood only. In yet another embodiment, the steering wheel rim would have a decorated plastic as the outer layer or a combination of structural elements combined with a decorative trim element. These are but a few examples of the many options available for a steering wheel rim that can be secured to a universal hub.

Another advantage of exemplary embodiments of the present invention is that the segmented rim also allows for different materials to be used in the center hub and spokes as opposed to those used in the rim. For example, the center hub and associated spoke portions could in one embodiment comprise die cast magnesium or aluminum while the rim structure could be plastic or magnesium or steel or a combination of any of these materials.

Referring now to FIGS. 1-10, a first embodiment of a steering wheel 10 constructed in accordance with an exemplary embodiment of present invention is provided. Here a steering wheel rim portion 12 is separately manufactured with an outer decorative layer (shown in phantom), which in one embodiment comprises a leather outer layer 11 secured over a foam layer or intermediary layer 15 molded about the circumscribing portion of the rim. Alternatively, outer layer 11 is vinyl or comprises a portion that has a wood insert secured thereto. The foam layer and decorative outer layer can be applied to the separate rim portion using known techniques. Non-limiting examples of know techniques are found in the following U.S. Pat. Nos. 6,761,086; 6,889,576; 6,928,898; 6,988,878; and 7,001,549 the contents of which are incorporated herein by reference thereto.

Accordingly, the decorative layer is applied after the cast molded rim or molded rim has had a layer of foam applied to it (again, the foam layer being shown in phantom). Here the rim is formed by a casting process or molding process and then the circumscribing portion of the cast formed rim is covered by a foam layer, which is then wrapped with a decorative leather or vinyl cover, which may or may not include a wood insert. In another application, the rim insert is covered by an injection molded plastic having the desired characteristics (e.g., durometer values and appearance). As used here rim portion refers to an inner cast formed or molded rim, covered with an intermediary foam layer or other equivalent layer covered with an outer decorative layer (e.g., leather, vinyl or other equivalent material) that is separately formed and then secured to a hub portion.

Also shown in FIGS. 1-10 is a hub portion 14, which is separately manufactured from the rim portion. Hub portion 14 has a pair of integral spoke portions 16 and 18. As illustrated in FIGS. 1-10, rim portion 12 further comprises a pair of integral spoke portions 20 and 22. Although only two spoke portions are illustrated it is, of course, understood that one or several spoke portions may be provided in accordance with exemplary embodiments of the present invention. The length of the integral spoke portions of the rim also dictate the size of the rim diameter being attached to the hub. For example, larger or longer spoke portions will require a larger rim if the hub and its integral spoke portions remain the same. Alternatively and if the integral spoke portions of the rim are shorter the rim diameter will be smaller thus, allowing a single hub size to be used with various sized rim diameters.

In accordance with an exemplary embodiment the steering wheel rim portion and the hub portion define the general shape and configuration of the steering wheel. The rim portion circumscribes the hub, and at least one spoke interconnects the hub with the rim.

Accordingly, a joint 24 between the spokes of the hub and the rim portion is provided at an intermediate location 26. This approach allows for the joining of the elements in a location without any secondary filler material (e.g., foam) under the leather and on top of the structural rim element where the joint is made as the joint is not within the circumscribing rim and typically foam and decorative outer coverings are not applied here. Thus, the cast or molded structural rim element can be covered with foam and a decorative outer layer while the uncovered spokes 16 and 18 are secured to uncovered spokes 20 and 22. With this approach the rim section or portion can be made in a low cost manufacturing site and the hub can be manufactured in another site and the rim portion is assembled to the hub in yet another location, for example, the country of use. This also allows the rim sections to be more efficiently packaged during shipment with more pieces packed per container as the substantially flat rim portions are more efficiently packaged. This design approach also allows for a common hub spoke section that could be joined to a variety of rim sections, non-limiting examples of the rim section could embody: different rim diameters; and trim levels (wood, leather, hydrographics, and urethane). The joining of the rim and spoke can be accomplished by any suitable fastening means such as: screws; rivets; welding particularly friction stir welding that allows for the joining of castings and dissimilar metals. In another alternative exemplary embodiment, a foam layer or plastic layer may also be separately applied to the hub, if necessary, using known technologies. Of course, the manufacture of the rim, the hub and assembly thereof may be performed at the same location wherein efficiency of the casting or molding machinery is improved due to the segmented parts.

FIGS. 1-10 illustrate one embodiment of the present invention, wherein a feature 28 of the hub spoke portion is received in a complimentary opening 30 in the rim spoke portion and thereafter the two are secured together by for example, a welding method.

Figure 11:
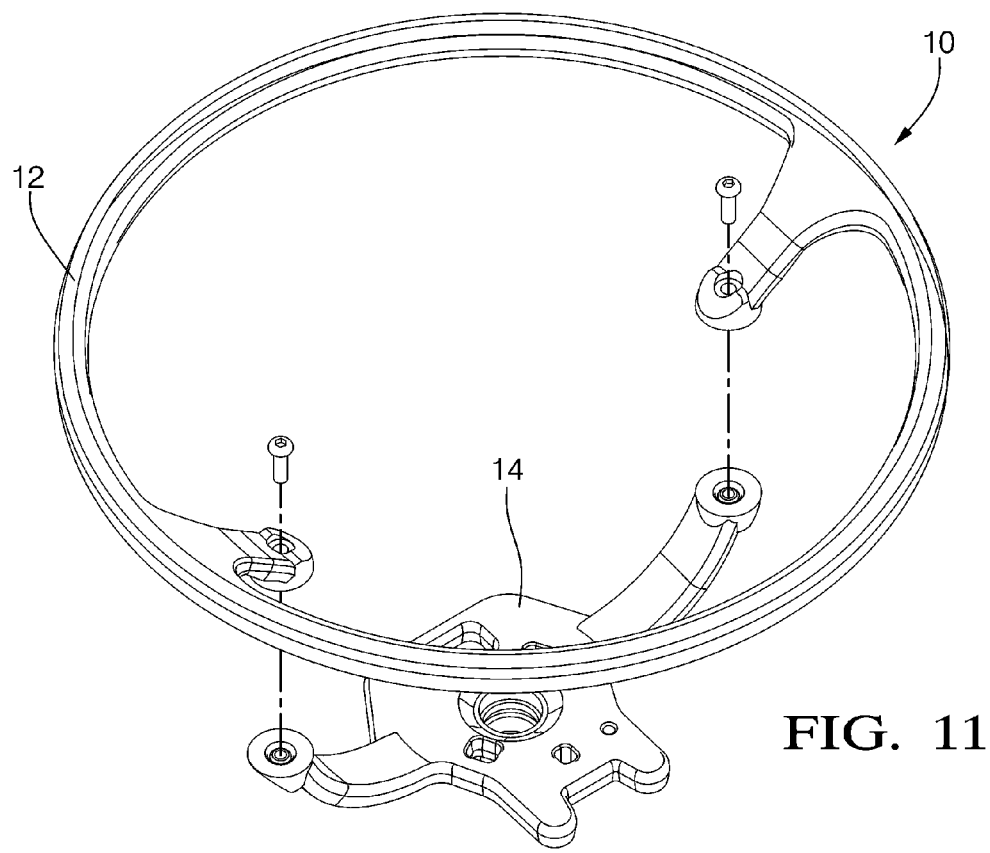
FIGS. 11-13 illustrate an alternative exemplary embodiment of the present invention.
Figure 12:
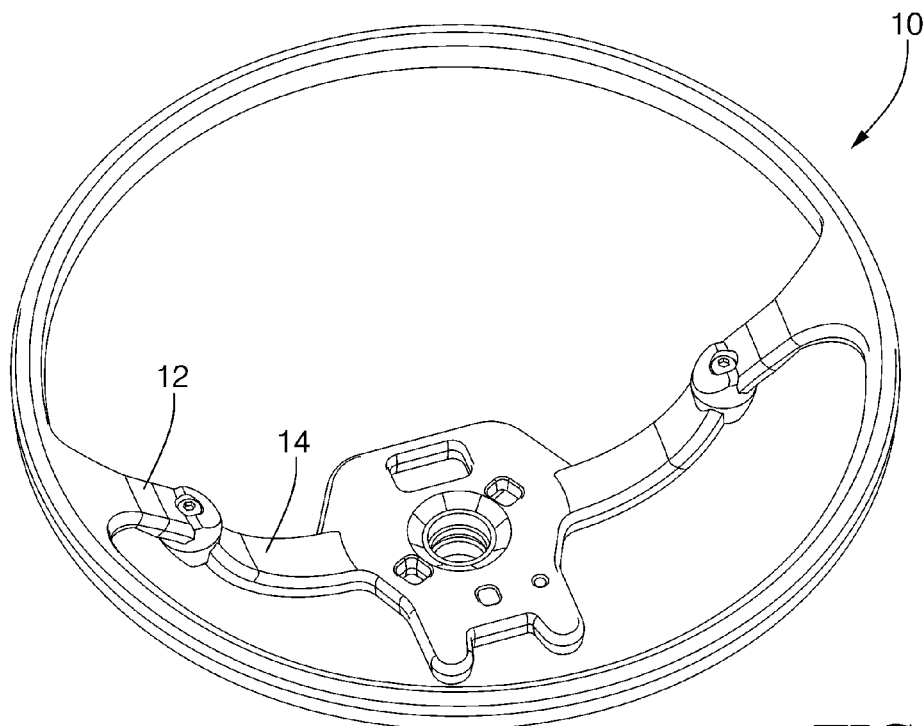
Figure 13:
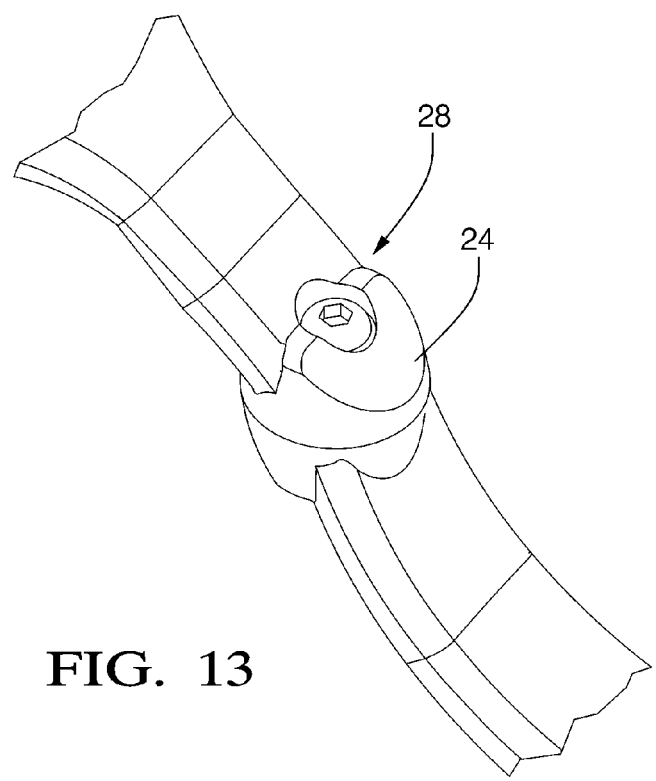

FIGS. 11-13 illustrate an alternative embodiment, wherein the rim portion is secured to the hub portion by passing a screw or rivet through complimentary openings in the spoke portions of both the rim and the hub and thereafter the two are secured together.

Once secured together, the steering wheel is eventually installed in a vehicle wherein an airbag module is secured to the hub and additional coverings (e.g., plastic shrouds) are applied to the uncovered spoke portions of both the hub the rim as required for aesthetic purposes.

Figure 15:
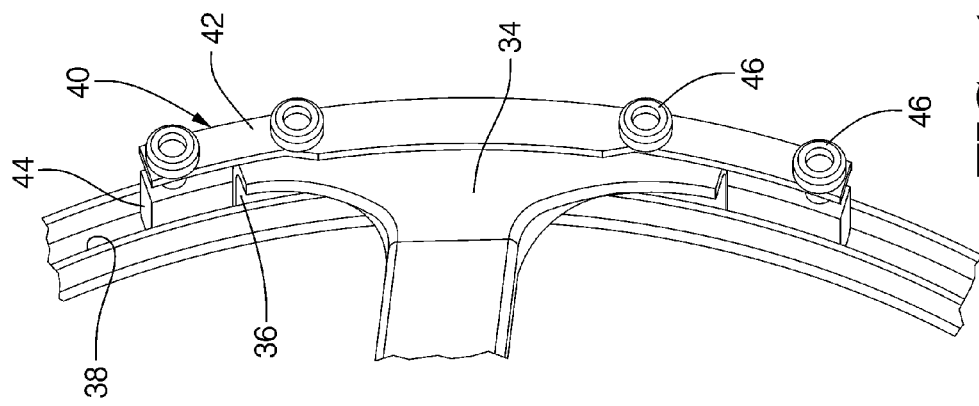
FIGS. 14-16 illustrate other alternative exemplary embodiments of the present invention.
Figure 14:
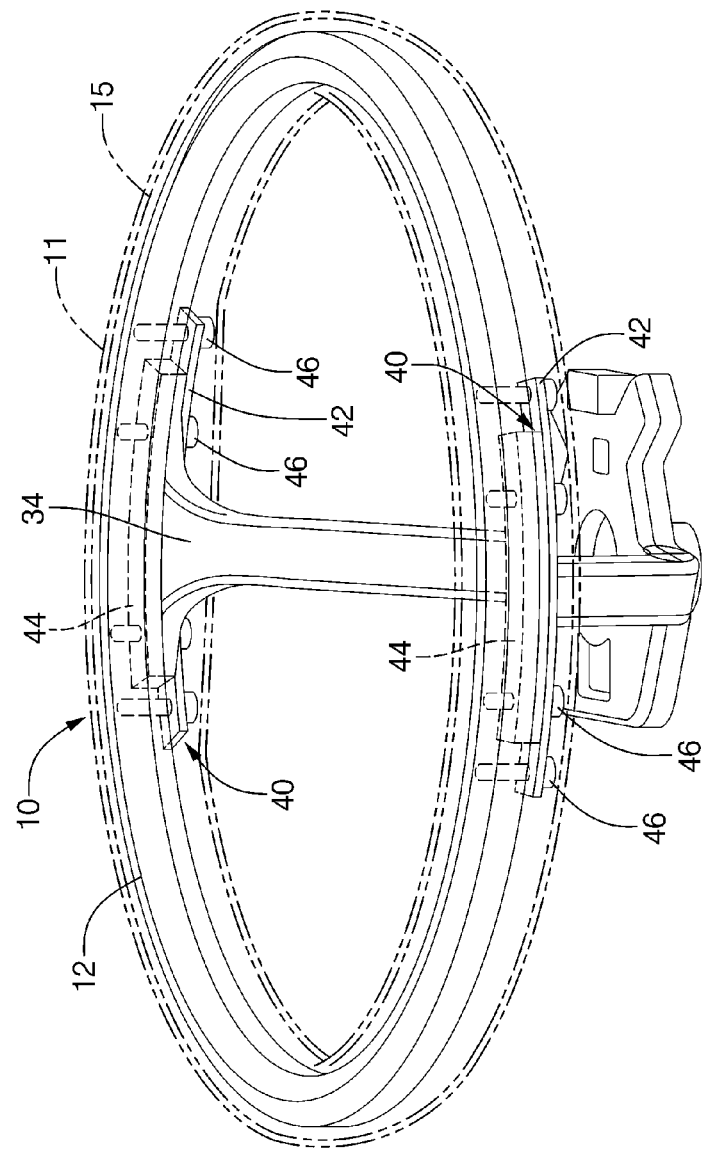
Figure 16:
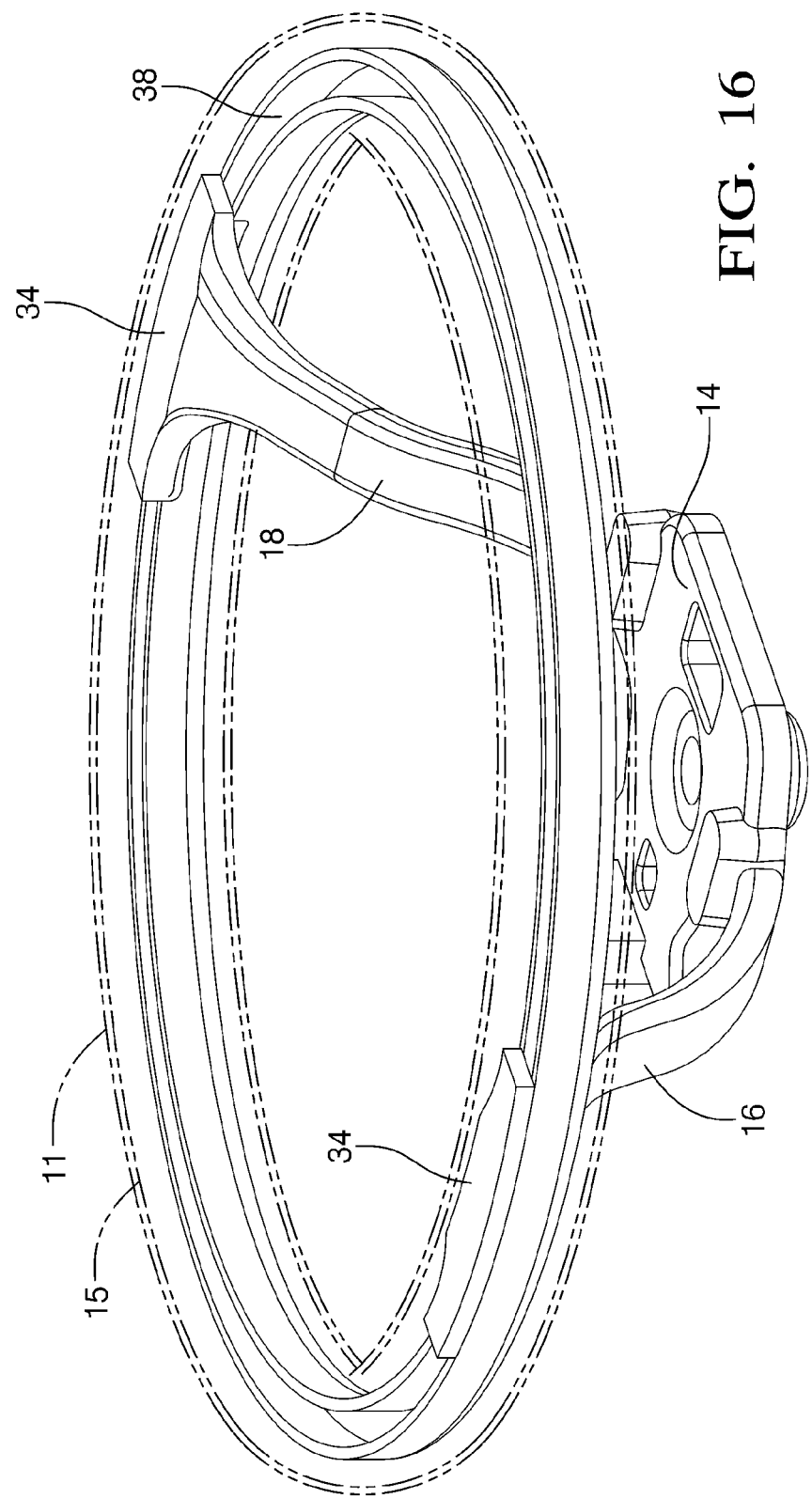

In another alternative embodiment and referring now to FIGS. 14-16 the hub portion is formed with extended spoke portions that extend all the way to the rim portion and the spoke portions are directly secured to the circumscribing portion 32 of the rim portion. In this embodiment, the ends of the spoke portions have an integral mounting member 34 each having a portion or feature 36 that is received within a slot, groove or opening 38 in the cast or molded structural rim. Here a mounting assembly 40 is provided to secure the spoke portion to the rim. In one exemplary embodiment, the mounting assembly comprises a mounting plate 42 that is secured to a mounting feature 44 of the rim via a plurality of mounting members 46 (e.g., rivets, screws and combinations thereof). The mounting plate provides distributed support to the mounting member as it is mounted to the rim. As the mounting plate is secured to the mounting feature a portion of the mounting member is secured therebetween and a portion of the mounting member is secured in the slot, groove or opening 38.

Accordingly, features of the spoke portion are configured to engage features in the cast or molded rim of the rim portion. In this embodiment and since the rim is applied with a foam covering prior to securement of the hub thereto, a portion of the foam on the rim is cut or folded back to reveal the features of the rim to which the spokes are to be secured. Alternatively, the tooling or die of the mold the rim is inserted into for the foaming process is configured to have features that prevents the foam from being adhered to the rim where the spoke portion of the hub is secured to the rim. As shown in FIGS. 14-16, the ends of the spokes can be secured to either the top or bottom portion of the rim. In this embodiment, securement is facilitated by any suitable means (e.g., welding, rivets, screws and combinations thereof). Once secured together, additional coverings (e.g., plastic shrouds) are applied to the uncovered spoke portions of both the hub and the rim, as required, for aesthetic purposes.

Figure 17:
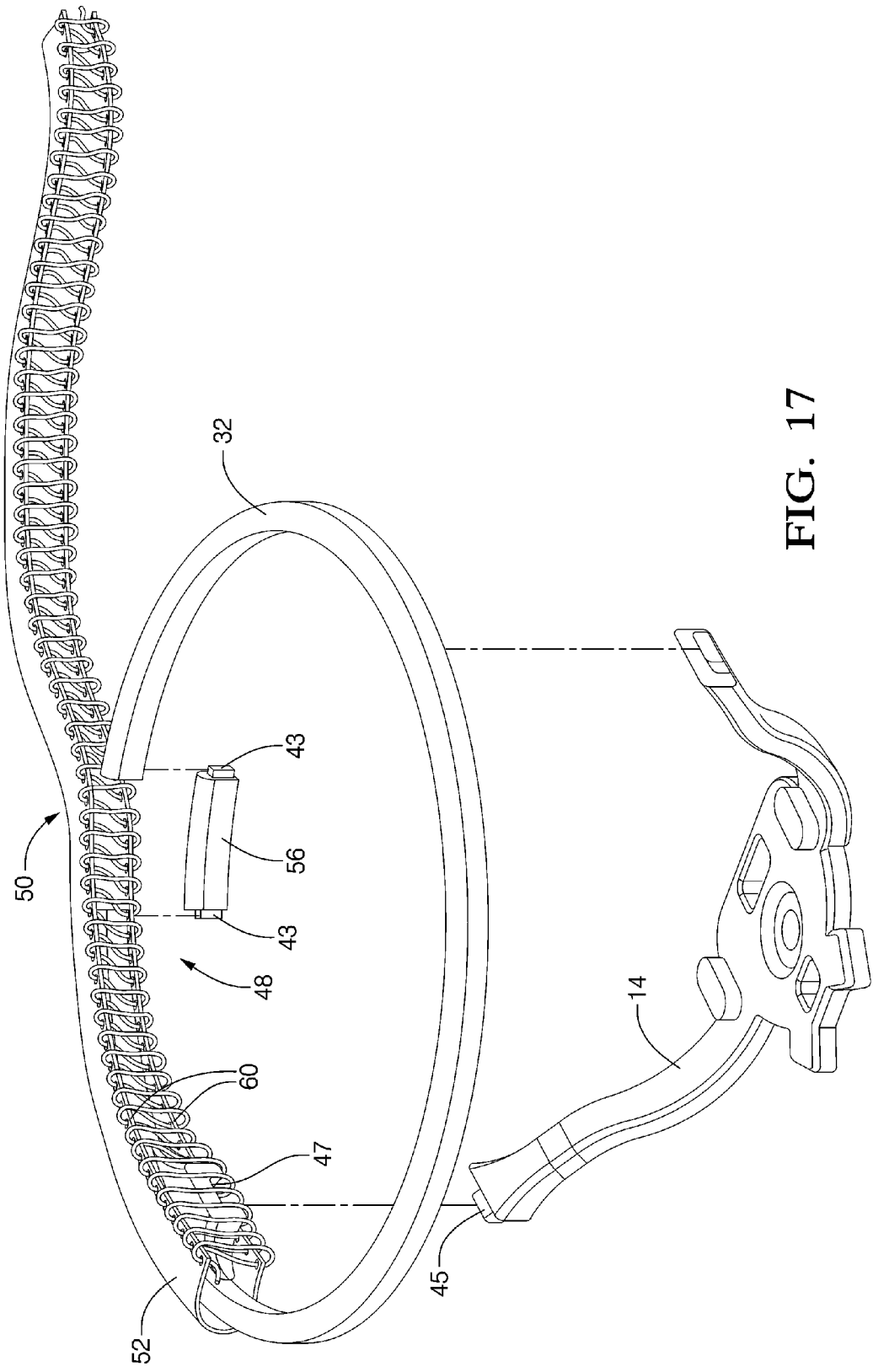
FIGS. 17-18 illustrate still another alternative exemplary embodiment of the present invention.
Figure 18:
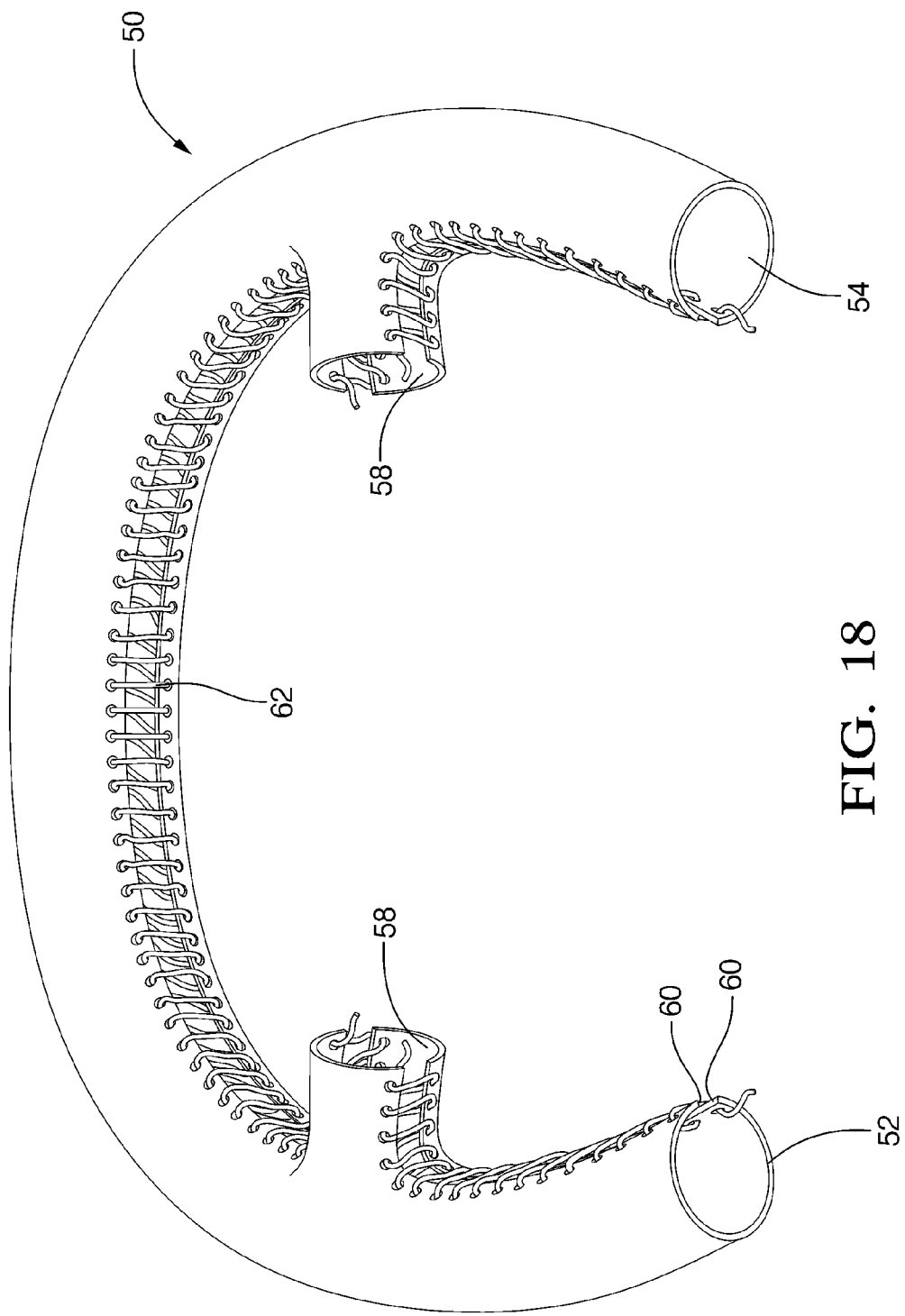

In another exemplary embodiment and referring to at least FIGS. 17-18, another alternative exemplary embodiment of the present invention is illustrated.

Here, the rim is provided with a joint or split 48. Split 48 provides a gap in the rim that allows a decorative leather sock or leather member 50 to be pulled over the rim section. In accordance with an exemplary embodiment of the present invention a rim insert 56 placed in the gap defined by the joint or split in the rim is foamed or covered with the insert in place, then the insert is removed by disengaging a feature of the insert from the rim in order to remove the insert from the rim to provide a gap or opening into which the leather sock or member can be slid through.

In accordance with an exemplary embodiment the leather sock comprises a decorative outer layer of the steering wheel. In accordance with an exemplary embodiment the leather sock comprises a piece or pieces of leather loosely sewn together and open at either end 52, 54 in order to allow the leather sock to be slid onto the rim portion via the gap or split in the rim.

Once end 52 is slid onto the rim the leather sock is slid onto the rim until end 54 and end 52 overlap each other. Prior to overlapping ends 52 and 54, insert 56 is inserted into the gap or split in the rim so that openings at ends 52 and 54 can be positioned over the insert. In accordance with an exemplary embodiment, the insert is configured to be secured to the rim via any suitable means, such as rivets, screws, complimentary features, wherein the gap in the rim is now filled. In one embodiment, the insert will comprise features 43 that engage complimentary features or openings in the rim in order to secure the insert into place after the leather sock has been applied to the rim.

Although not shown in FIG. 17 it is understood that rim 12 will be covered by a foam material (shown in phantom in FIGS. 1, 2 and 16) prior to the leather sock being applied thereto. It being understood that both rim 12 and insert 56 are covered with the foam material.

Once insert 56 is positioned back into rim 12 the same is secured thereto by any suitable process. It is also understood that insert 56 will also be covered by a foam material during its removal and replacement into the rim.

FIG. 17 also shows alternative features 45 and 47 (e.g., protrusion and slot or opening) for securement of the spoke portions to the rim insert.

In accordance with an exemplary embodiment and as illustrated in FIG. 18, the leather sock will have a plurality of openings 58 disposed about the periphery of the sock to allow for securement of the spokes of the hub to be secured to the rim. In one embodiment, the rim will have features to allow for securement of the spoke portions to the rim portion. In another exemplary embodiment, the rim portion will have integral spoke portions that depend away from the rim and are configured to be secured to complimentary spokes of the hub portion (See at least FIGS. 1-13).

In accordance with an exemplary embodiment, the plurality of openings are defined by peripheral edges 60 of the leather material loosely sewn together by a plurality of stitches 62. Once the leather sock is placed over the rim and the plurality of openings are aligned with the spokes of the rim or the features of the rim and the insert is secured within the gap in the rim, the leather sock is tightened about the rim by, for example, tightening of the loosely sewn threads of the leather sock. In one embodiment, a spoke portion is secured to the insert and in another embodiment, no spoke portions are secured to the insert. In addition and in one embodiment, an inside surface of the leather sock will have an adhesive applied thereto prior to application of the sock to the rim. Alternatively, the outer surface of the rim may have the adhesive applied thereto prior to the leather sock being slid onto the rim.

The joint between the rim and spoke can be accomplished by any suitable fastening means such as: screws; rivets; welding, in particularly friction stir welding that allows for the joining of castings and dissimilar metals.

In accordance with an exemplary embodiment, the joint for securing the insert to the rim comprises a tongue and groove joint where the rim is secured to the insert. In accordance with one alternative exemplary embodiment and where this joint is made there will be no covering material on the rim. In one embodiment, the separate insert or plug is installed after the joint is made and before the leather is completely sealed to the rim. In this embodiment, the diameter or outer periphery of the insert is the same as the diameter or outer periphery of the cast or molded rim so that the inset can be separately formed from the cast or molded rim, then the two are covered by the leather decorative outer layer.

The rim itself could be made of a combination of materials or in a ubiquitous fashion where only one material is used. The structural materials in the rim could include: cast or wrought magnesium or aluminum and steel.

In accordance with an exemplary embodiment, the steering wheel rim and insert for the gap in the steering wheel rim is cast formed. Thereafter, the steering wheel rim and the insert are formed with a cushion layer and then an outer covering is applied thereto. In this embodiment, the outer covering is the leather sock, which is slid onto the rim portion by sliding the same over the gap in the steering wheel rim portion.

As discussed above the rim, the insert and the hub portion are formed by a casting process, wherein each of the portions are separately formed. Alternatively, the rim and the insert are cast in the same mold however, the rim and the insert are not secured together. Once the rim and the insert are formed by the casting process, they are then covered with a foam cushion in accordance with known foaming techniques. In addition, the hub portion is also covered with a foam layer (where necessary) after the hub has been cast. Alternatively, the hub and the spokes are covered by upper and lower shrouds secured thereto after the rim has been secured to the hub. In accordance with an exemplary embodiment of the present invention the shrouds define an opening for an airbag module to be secured to the hub of the steering wheel.

After, the rim has been formed with the foam layer, the gap which is now covered with foam is cut out and pieces are removed to expose fasteners or keyways for securing the insert separately formed insert to the rim.

Now that the gap is exposed the leather sock, which is loosely sewn together is slid over the rim until the openings in the sock align with the locations the spokes are secured to the rim or wherein integral spoke portions depend away from the rim.

Once aligned, the leather portion is tightened about the rim portion by pulling the stitches of leather together and by hand sewing the same about the spoke portions. In addition, the open ends of the sock are positioned over the gap in the steering wheel rim and the insert is then positioned in the gap and the same is secured to the rim. In one embodiment, the leather portion is also secured to the foam layer of the steering wheel insert by an adhesive that is applied to the inside surface of the leather layer and/or the foam layer.

Exemplary embodiments of the present invention related to methods for the design and manufacture of a steering wheel. The basic premise of exemplary embodiments of the present invention are to segment the rim from the spokes and hub of the steering wheel, by doing this several benefits are incurred. These benefit include but are not limited to: the ability to purchase or manufacture the rim (with leather and/or wood trim) as a separate component, which allows for improved packaging efficiencies making the shipping costs lower as well as a variety of designs as disclosed herein.

In accordance with exemplary embodiments of the present invention a method or methods of manufacturing steering wheels are disclosed. In a first step the rim and hub or steering wheel hub or armature are formed via a die cast or equivalent process at separate locations.

In a next step the rim is covered with foam. In one embodiment, the rim has integral spoke sections and the rim has a decorative layer (e.g., leather, wood, simulated wood, plastic, vinyl or combinations thereof) applied thereto, wherein a portion of the spokes of the rim may be covered with the decorative layer and underlying intermediary foam layer. In other embodiments, the rim has recessed features for securement of the spoke portions of the hub thereto wherein portions of the foam are removed to access the securement features. In another embodiment, the rim has a removable insert or plug to define a gap in the rim. In this embodiment, the foam of the insert is precision cut out after the foaming process and the features of the insert no longer engage features of the rim to which the insert is removably secured. Thereafter a leather sewn sock with holes or openings for the spokes of the steering wheel is slid onto the rim through the opening that is provided after the insert has been removed.

In one embodiment, the leather sewn sock is placed on a mandrel to expand loosely applied stitching in order to allow the expanded leather sewn sock to be slid onto the rim portion of the steering wheel. In addition, a lubricated glue or adhesive is applied to the inner surface of the leather sock or an exterior surface of the foamed rim insert to be covered by the leather sewn sock. In either application, the lubricating adhesive allows the sock to be slid on and once in position, the leather adhesive secures the sock in position once the stitching has been tightened.

Once the sock is in the desired position, the insert is positioned in the gap by manipulating either end of the sock to allow the insert to be secured to the rim. Here the features of the insert are secured to the rim. Thereafter, the ends of the sock are secured to each other and the loose stitching is tightened and sock is secured in place. In addition, the openings of the sock are aligned with the areas the spoke portions are to be secured to the rim. Thereafter, the spoke portions of the armature are secured to the rim by anyone of the aforementioned embodiments.

Finally, the stitching of the leather sock is tightened and heat is applied to cure the adhesive between the inner surface of the leather sock and the rim portion.

Figure 19:
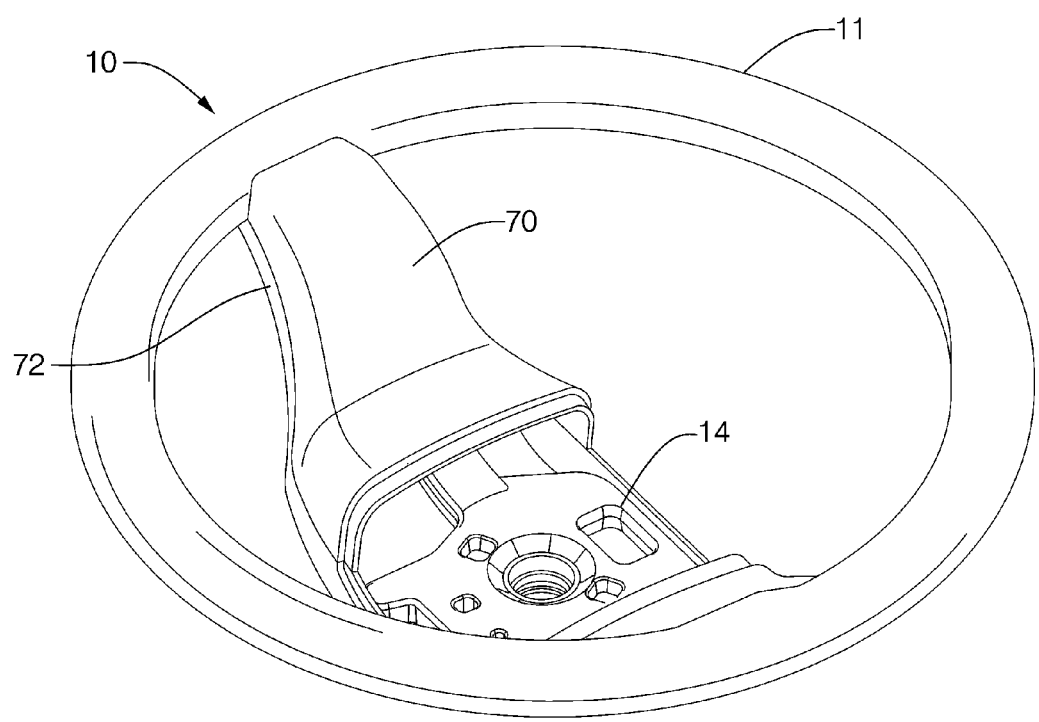
FIG. 19 illustrates an assembled steering wheel in accordance with an exemplary embodiment of the present invention.

In any of the aforementioned embodiments and after the hub has been secured to the rim portion, an upper shroud portion or portions 70 (FIG. 19) are secured to an upper portion of the integral spoke sections and a lower shroud portion 72 (FIG. 19) is secured to the hub and its integral spoke sections and, the upper and lower shrouds are secured to the steering wheel such that the joint 24 or other joints are covered by the shroud portions. In one non-limiting exemplary embodiment, the upper and lower shroud portions are formed from an easily molded material such as plastic and the shroud portions are secured to the hub by a plurality of screws or other equivalent fasteners. In still another embodiment, the shrouds are secured to each other via a friction welding process, adhesives, fasteners, combinations thereof or any other equivalent process. In addition, and in the embodiments where the rim has integral spoke portions (FIGS. 1-13) the integral spoke portions may have a portion of the foam and decorative covering layer disposed thereon until an end portion of the foam and decorative covering layer on the spoke is covered by the upper and lower shrouds (FIG. 19) thus providing an aesthetically pleasing show surface of the steering wheel.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing a steering wheel, comprising:
    forming a rim portion separately with a decorative outer coating via a first forming process, the rim portion including a circumferential opening;
    applying a decorative outer coating to at least a substantially portion of a circumference of the rim portion, the decorative outer coating being a sock, the opening configured to allow the sock to be slid over the rim by passing the sock through the opening;
    subsequent to the passing of the sock through the opening, attaching a removable insert to the rim portion to close the circumferential opening;
    forming a hub separately from the rim portion via a second forming process, the hub having at least a pair of hub spoke portions; and securing the rim portion to the pair of hub spoke portions, wherein the decorative outer coating is applied to the rim portion prior to the rim portion being secured to the pair of hub spoke portions.

2. The method as in claim 1, wherein the decorative outer coating is a tube of leather material defined by loosely stitching a pair of ends of the leather material together.

3. The method as in claim 2, wherein the tube of leather material is loosely secured together by a plurality of threads to allow the tube of leather material to be slid about the rim and the method further comprises the step of tightening the plurality of threads after the tube of leather has been slid about the rim.

4. The method as in claim 3, further comprising applying an adhesive to an inner surface of the tube of leather material prior to the tube of leather being slid onto the rim.

5. The method as in claim 2, wherein the tube of leather material has at least a pair of openings for alignment with the pair of hub spoke portions.

6. The method as in claim 1, wherein the decorative outer coating is a leather sock.

7. The method as in claim 6, wherein one of the pair of hub spoke portions is secured to the rim portion at the opening after the leather sock is slid over the rim.

8. The method as in claim 1, wherein the second forming process is a die casting process and the hub is formed from magnesium and wherein the decorative outer coating is leather.

9. The method as in claim 1, wherein the second forming process is a die casting process and the hub is formed from aluminum and wherein the decorative outer coating is leather.

10. The method as in claim 1, wherein the second forming process is a die casting process and the hub is formed from magnesium and the rim portion is configured for mounting to the pair of hub spoke portions.

11. The method as in claim 1, wherein the rim portion is configured for mounting to the pair of hub spoke portions.

12. The method as in claim 1, wherein the pair of hub spoke portions are secured to either an upper surface or lower surface of the rim portion.

13. The method as in claim 1, wherein securing the rim portion to the pair of hub spoke portions includes engaging distal ends of the hub spoke portions with slots defined by the rim.

14. A method of manufacturing a steering wheel, comprising:
    forming a rim portion defining a circumferential opening;
    applying a generally tubular, decorative outer coating to at least a substantial portion of a circumference of the rim portion by passing the decorative outer coating through an opening in the rim portion;
    subsequent to the passing of the decorative outer coating through the opening, attaching a removable insert to the rim portion to close the circumferential opening;
    forming a hub separately from the rim portion via a second forming process, the hub having at least a pair of radially extending hub spoke portions; and
    securing the rim portion to the pair of hub spoke portions, wherein the decorative outer coating is applied to the rim portion prior to the rim portion being secured to the pair of hub spoke portions.

15. The method as in claim 14, wherein securing the rim portion to the pair of hub spoke portions includes engaging distal ends of the hub spoke portions with slots defined by the rim.

* * * * *